United States Patent [19]

Smith

[11] 4,221,510
[45] Sep. 9, 1980

[54] WITHDRAWAL OF PARTICULATE MATERIAL FROM A HOPPER

[75] Inventor: Kenneth C. Smith, Woodstock, Canada

[73] Assignee: Teledyne Canada Ltd., Rexdale, Canada

[21] Appl. No.: 10,951

[22] Filed: Feb. 9, 1979

[51] Int. Cl.² .................. B65G 53/38; B65G 53/24
[52] U.S. Cl. .................................. 406/118; 406/123
[58] Field of Search ............... 406/11 B, 123, 122, 406/116, 115, 119; 222/1

[56] References Cited

U.S. PATENT DOCUMENTS

| | | | |
|---|---|---|---|
| 489,340 | 1/1893 | Stoner | 406/118 X |
| 730,934 | 6/1903 | Leary | 406/123 UX |
| 2,673,127 | 3/1954 | Gebhardt | 406/118 UX |
| 3,224,648 | 12/1965 | Zimmerman | 222/193 |
| 3,316,028 | 4/1967 | Lloyd | 406/118 |
| 3,544,167 | 12/1970 | Fuchu et al. | 406/116 X |

Primary Examiner—Robert B. Reeves
Assistant Examiner—Gene A. Church
Attorney, Agent, or Firm—Ridout & Maybee

[57] ABSTRACT

Pneumatically-conveyable particulate material is withdrawn from a hopper using vacuum wands extending into the interior of the hopper. The wands are operated in a cyclic sequence, with material being withdrawn from each wand in turn. This permits material to be withdrawn substantially continuously where the material tends to compact together in flow-preventing bridges and the invention can be put into practice employing a relatively simply applied attachment connected on the exterior of the hopper.

9 Claims, 1 Drawing Figure

U.S. Patent    Sep. 9, 1980    4,221,510
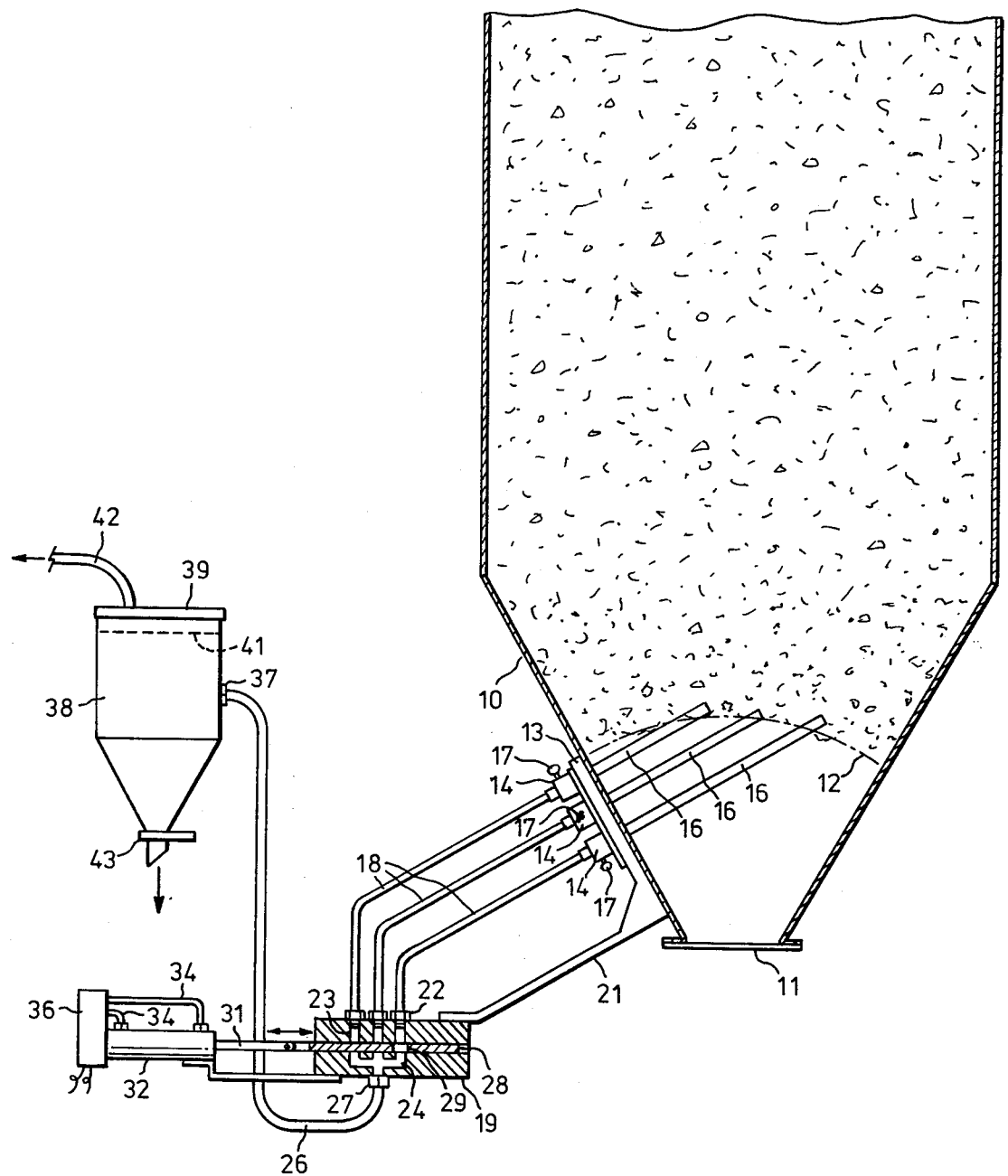

WITHDRAWAL OF PARTICULATE MATERIAL FROM A HOPPER

BACKGROUND OF THE INVENTION

The present invention relates to a method and apparatus for withdrawal of flowable particulate material from a hopper.

In the storage of particulate materials in hoppers, the problem is frequently encountered that the particulate material forms within the hopper a compacted bridge which prevents free downflow of the particulate material through the hopper body. This problem is most frequently encountered adjacent the usually converging side wall of the hopper body, immediately above the lower discharge port of the hopper; and arises through mismatching of the flowing properties and/or the angle of repose of the flowable material with the angle of convergence of the hopper walls, so that the effect of the inward sloping of the side walls of the hopper body is to cause the particulate material to be compacted together, effectively preventing discharge of the particulate material through the normal lower discharge opening.

Before the present invention, once this problem has been encountered in a storage facility, there has been no satisfactory way of obtaining an uninterrupted outflow of the material from the interior of the hopper. Redesign and reconstruction of the hopper is inappropriate if the hopper is to be used with materials of varying flowing characteristics and is in any event frequently prohibitively expensive. The use of simple hand-held implements to break-up the obstruction is effective only as a temporary expedient and will often expose operatives to hazards of injury and contamination by irritating or noxious stored materials.

SUMMARY OF THE INVENTION

The invention provides a method whereby flowable particulate material may be withdrawn pneumatically from a hopper wherein the normal downflow of material has been prevented by the occurrence of the compacted internal bridging problem referred to above. The invention also provides an attachment adapted to be attached to the exterior of the hopper body for obtaining a substantially continuous outflow of the material, without needing to undertake reconstruction of the hopper body.

In this invention, the wall at the lower region of the hopper is penetrated by a series of hollow wands which are arranged so that their inlet orifices are spaced apart transversely across the lower region of the hopper. Vacuum is then applied on each of the wands in turn for a predetermined period in a cyclic sequence of operation, so that material is withdrawn through each wand in turn. This arrangement can provide a substantially continuous, uninterrupted outflow of particulate material from the hopper, and by appropriate positioning of the wands can be used to withdraw material from the region where a flow-preventing bridge has developed within the hopper.

At least two, and preferably at least three uniformly spaced wands are employed. If only a single vacuum wand is inserted in the hopper, the discharge of material is unreliable as the material tends to form a compacted flow-preventing bridge around the wand orifice after withdrawal of a certain amount of the material, and, moreover, use of a single wand tends to result in a residue of the particulate material being left in regions of the hopper remote from the wand orifice. With the arrangement of the invention, by control of the period for which material is withdrawn through each wand, it is possible to discontinue withdrawal through any given wand before the discharge is interrupted due to formaton of a compacted bridge in the zone above the inlet orifice and material being exhausted from the region underneath the bridge. Subsequently, when material is withdrawn from an adjacent wand, this tends to disrupt any bridges that have formed above the inlet orifices of the wands adjacent thereto. Moreover, by appropriate positioning of the wands, material can be withdrawn from substantially all regions of the hopper, so that there is no residue of material left permanently in the hopper. This latter feature is especially important where the particulate material is of such nature that its flowability deteriorates with time, especially where the particulate material tends to harden-up into a non-flowing cementitious mass on prolonged storage. Examples include hygroscopic and/or chemically-reactive powdered materials, e.g. powdered lime.

BRIEF DESCRIPTION OF THE DRAWINGS

The invention will now be more fully described, by way of example only, with reference to the accompanying drawings which show a partly diagrammatic side view, partially in vertical section of a hopper equipped with a particulate material-withdrawing attachment in accordance with the invention.

DESCRIPTION OF THE PREFERRED EMBODIMENT

Referring to the drawings, a vertically-extending hopper has a side wall 10, that converges downwardly towards a normal outlet opening 11 at the bottom.

As illustrated, the hopper is used for the storage of a pneumatically-conveyable particulate material. Examples include fine and coarse powders, granular materials, flake materials, staple fibres, small-sized aggregated, tableted, briquetted, or granulated materials, small lightweight mechanical elements, e.g. lightweight metal items such as lightweight mechanical fasteners, and such items as lightweight metal bottle caps.

As discussed in more detail above, in the storage of such materials in hoppers, there is frequently a tendency for the materials to compact together to form a compacted bridge, as indicated in broken lines at 12 in the drawing. It will be appreciated that the region where the material forms a bridge 12 is the region where the hopper offers maximum resistance to downward flow of the particulate material.

The drawings illustrate an attachment for attachment on the side wall of the hopper body for use in withdrawing the particulate material from the hopper. The attachment comprises a support member in the form of a bracket with an upper arm 13 conforming to the exterior surface of the hopper body wall, and being secured to the hopper wall 10 by welding or by mechanical fasteners (not shown). Connected on the outer side of the upper arm 13 are three collar portions 14 through each of which passes slidably a hollow rigid wand 16, e.g. of rigid tubular metal or plastic. Each collar is provided with a set screw 17 which can be tightened by hand pressure to engage the wand 16 and locate it firmly in a fixed position relative to the collar 14.

A vacuum conduit 18 extends from each wand 16 to a valve 19 supported on a lower arm 21 of the support bracket.

Each vacuum conduit 18 connects through a respective threaded connector 22 to a respective port 23 in the valve 19. On the opposite side of the valve 19 is a manifold 24 including a passageway in registration with each port 23. The manifold connects to a main vacuum line 26 through a threaded connector 27. The valve includes a reciprocating valve element 28 including a valve aperture 29.

The reciprocating element 28 is actuated through connection to a piston 31 working in a cylinder 32 connected through fluid supply lines 34 to an appropriate control mechanism illustrated schematically at 36. The mechanism 36 supplies fluid so as to reciprocate the piston 31 and thus reciprocate the valve element 28 between positions selectively connecting each of the ports 23 for a predetermined period of time to the manifold 24 in the main vacuum line 27.

The main vacuum line 26 connects to an input port 37 on the side of a conventional form of vacuum-operated hopper feeder body 38 having a lid 39 equipped with a filter 41. A vacuum is drawn, from the side of the filter opposite the input 37 through a further vacuum line 42 connected to an aspirator or other vacuum-applying means (not shown).

In operation, when installing the attachment on a hopper from which particulate material is to be withdrawn, it is merely necessary to drill a sufficient number of holes, in this case three, through the wall of the hopper body 10 in order to accommodate the wands 16. After attachment of the upper arm 13 of the support bracket on the exterior of the hopper body 10, with the set screws 17 loosened, the interior of the hopper body is probed with the wands 16, so that each wand penetrates a small distance into the compacted mass of particulate material forming the lower surface of the bridge 12, as illustrated in the drawings. Desirably, the wands are arranged so that their inlet orifices are spaced apart substantially uniformly transversely across the mass of compacted material forming the bridge 12. The set screws 17 are then tightened up to retain the wands securely in their adjusted position.

The valve 19 is then operated, and the aspirator or other source of main vacuum is applied on the vacuum line 42, to apply a vacuum on the hopper feeder body 38 and the main vacuum line 26.

As a result of the cyclic operation of the valve 19, a partial vacuum is applied on each of the wands 16 for a predetermined period in turn, so that particulate material is withdrawn successively through each of the wands 16. Thus, where, as illustrated, the valve element 28 has its aperture 29 initially in registration with the port 23 on the right-hand side, as viewed in the drawings, material is withdrawn from a zone of the bridge 12 immediately surrounding the inlet orifice of the wand 16 at the right-hand side of the drawings. After a predetermined period, material is withdrawn through the central wand 16, then through the left-hand wand 16, and then as the element 28 reverses its motion, material is then again drawn through the central wand, and after a predetermined period the position of withdrawal reverts to the right-hand wand, and the above-described cycle is repeated.

The cycle of operation as described above wherein, at each stage of operation material is withdrawn from a zone that is contiguous with the zone from which material was withdrawn during the preceding period, is especially advantageous, as withdrawal from a given zone not only disrupts bridge formation in regions above the zones contiguous therewith, but also tends to agitate the material in the contiguous zones, and render it more readily flowable and withdrawable from the hopper. It is therefore advantageous to withdraw material from a zone which has been to some extent fluidized as a result of withdrawal of the material from a contiguous zone during the preceding period of withdrawal.

It is, however, possible, although less advantageous to operate the wands in a sequence such that at the end of each cycle, after withdrawal from a zone at one extreme end of the bridge 12, instead of withdrawal being next conducted from a contiguous zone, the cycle repeats by commencement of withdrawal from a zone at the opposite end of the bridge i.e. with the transverse advancement of the zone of withdrawal being uni-directional across the bridge 12, instead of oscillating leftwardly and rightwardly as in the example illustrated in the drawings.

The material withdrawn through the wands passes through the vacuum lines 18, to the valve 19 and out through the main vacuum line 26 to the hopper feeder body 38, where it is separated at the filter 41, and collects in the hopper body 38, for discharge in controlled fashion through a discharge gate 43 at the bottom of the hopper feeder body 38, as indicated by the arrow in the drawings.

The principle of withdrawal of materials in cyclic sequence through a plurality of orifices spaced transversely over the lower region of the hopper may also be applied with advantage to hoppers that have parallel, vertical side walls, as these may also be subject to internal bridge-formation that interferes with free outflow of the stored particulate material.

It will be appreciated that although the drawings illustrate an example in which three withdrawal wands 16 are employed, depending on the dimensions of the hopper 10 as few as two or more than three wands may be employed. However, where a large number of wands are employed, extending over a compacted bridged portion of relatively large extent, it is more important to arrange the sequence of operation of the wands to be such that at each stage material is withdrawn from a zone contiguous with the zone from which material was withdrawn during the previous stage, so that the benefits of the agitation of the material due to withdrawal of material from a contiguous zone may be obtained, without giving the material in each zone an opportunity to settle into a compacted mass prior to the commencement of withdrawal of material from that zone.

I claim:

1. A particulate material-withdrawing attachment for connection on the side of a hopper, comprising a support member adapted to be attached on the side of the hopper, at least two hollow wands on said support member whereby the extent of each wand laterally from the support member can be adjusted, and a conduit connected to each wand, said conduits being connected in common to a main vacuum line through valving means interposed between each wand and a common separating means for separating the particulate material from entraining air, said valving means operating cyclically to selectively connect each of said wands in turn to said common separating means and vacuum line.

2. Attachment as claimed in claim 1 wherein said separating means comprise a vacuum-operated hopper feeder body.

3. A particulate material-feeding system comprising a hopper having a side wall, pneumatically-conveyable particulate material in said hopper, said hopper defining a region of maximum resistance to flow of said particulate material, a plurality of hollow wands extending laterally through said side wall and each having an inlet orifice within the hopper at said region, said orifices being spaced apart transversely across said region of the hopper, and means for cyclically applying a partial vacuum for a predetermined period on each of said wands in a predetermined sequence so that particulate material is withdrawn successively through each of said wands in turn.

4. A system as claimed in claim 3 comprising at least three wands, said orifices being substantially uniformly spaced apart.

5. A system as claimed in claim 4 wherein after each predetermined period, withdrawal of material is commenced through a wand adjacent to the wand through which material was withdrawn during the preceding period.

6. A system as claimed in claim 3 wherein said hopper has a downwardly converging side wall, and said orifices extend in a region where the particulate material forms a downward flow-preventing bridge within the hopper adjacent said downwardly converging wall.

7. A method for withdrawing pneumatically-conveyable particulate material from a hopper, comprising withdrawing particulate material under vacuum from a series of contiguous zones extending transversely across a lower region of the hopper where the hopper offers maximum resistance to downward flow of the particulate material, said material being withdrawn from said zones in a predetermined sequence wherein said material is withdrawn from each of said zones in turn for a predetermined period.

8. A method as claimed in claim 7 wherein after each said period material is withdrawn from a zone contiguous with the zone of withdrawal during the preceding period.

9. A method as claimed in claim 7 wherein said hopper has a downwardly-converging side wall and said series of zones extend transversely across a region where the particulate material forms a downward flow-preventing bridge.

* * * * *